(12) United States Patent
Yang et al.

(10) Patent No.: US 11,271,672 B2
(45) Date of Patent: Mar. 8, 2022

(54) INFORMATION TRANSMISSION METHOD AND DEVICE

(71) Applicant: HUAWEI TECHNOLOGIES CO., LTD., Guangdong (CN)

(72) Inventors: Jianbing Yang, Shenzhen (CN); Yang Li, Beijing (CN); Xingqing Cheng, Beijing (CN); Lei Wan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/735,380

(22) Filed: Jan. 6, 2020

(65) Prior Publication Data

US 2020/0145127 A1 May 7, 2020

Related U.S. Application Data

(63) Continuation of application No. 16/158,509, filed on Oct. 12, 2018, now Pat. No. 10,530,522, which is a (Continued)

(30) Foreign Application Priority Data

Mar. 2, 2012 (CN) .......................... 201210054842.6

(51) Int. Cl.
*H04L 1/00* (2006.01)
*H04L 27/36* (2006.01)
*H04L 1/18* (2006.01)

(52) U.S. Cl.
CPC .......... *H04L 1/0005* (2013.01); *H04L 1/0016* (2013.01); *H04L 1/0025* (2013.01);
(Continued)

(58) Field of Classification Search
None
See application file for complete search history.

(56) References Cited

U.S. PATENT DOCUMENTS 7,173,974 B2  2/2007  Sindhushayana
7,898,948 B2  3/2011  DiGirolamo et al.
(Continued)

FOREIGN PATENT DOCUMENTS

CN  101373994 A  2/2009
CN  101388744 A  3/2009
(Continued)

OTHER PUBLICATIONS

Qualcomm Europe, "Performance comparison of 4-bit vs. 5-bit CQI reports", 3GPP TSG-RAN WG1 #51bis Jan. 14-18, 2008, Sevilla, Spain, R1-080495, Jan. 18, 2008, 8 pages.
(Continued)

*Primary Examiner* — Adolf Dsouza

(57) ABSTRACT

A method includes: reporting, by a UE, a CQI value to an eNB; receiving, by the UE, an MCS value sent by the eNB, where the MCS value is determined by the eNB according to the CQI value; and receiving, by the UE, PDSCH data according to the MCS value, where the CQI value and the MCS value are determined according to a second set of tables, where a modulation scheme that can be supported by the second set of tables is higher than 64QAM.

24 Claims, 3 Drawing Sheets

Related U.S. Application Data continuation of application No. 15/854,641, filed on Dec. 26, 2017, now Pat. No. 10,103,838, which is a continuation of application No. 15/271,044, filed on Sep. 20, 2016, now Pat. No. 9,871,618, which is a continuation of application No. 14/474,532, filed on Sep. 2, 2014, now Pat. No. 9,479,287, which is a continuation of application No. PCT/CN2013/071684, filed on Feb. 20, 2013.

(52) U.S. Cl.
CPC .......... *H04L 1/0026* (2013.01); *H04L 1/1812* (2013.01); *H04L 27/36* (2013.01)

(56) References Cited

U.S. PATENT DOCUMENTS

| | | | |
|---|---|---|---|
| 9,871,618 B2 * | 1/2018 | Yang | H04L 1/0005 |
| 2008/0095185 A1 * | 4/2008 | DiGirolamo | H04W 72/085 |
| | | | 370/464 |
| 2009/0161613 A1 | 6/2009 | Kent et al. | |
| 2009/0245408 A1 * | 10/2009 | Mujtaba | H04B 7/0417 |
| | | | 375/267 |
| 2009/0268833 A1 * | 10/2009 | Ariyavisitakul | H04B 17/373 |
| | | | 375/262 |
| 2010/0290559 A1 | 11/2010 | Futagi et al. | |
| 2011/0103335 A1 | 5/2011 | Golitschek Edler Von Elbwart et al. | |
| 2011/0255584 A1 | 10/2011 | Dateki | |
| 2012/0127934 A1 * | 5/2012 | Anderson | H04W 72/0406 |
| | | | 370/329 |
| 2013/0286884 A1 | 10/2013 | Li et al. | |
| 2015/0009927 A1 | 1/2015 | Larsson et al. | |

FOREIGN PATENT DOCUMENTS

| | | |
|---|---|---|
| CN | 101448284 A | 6/2009 |
| CN | 101568145 A | 10/2009 |
| CN | 101630991 A | 1/2010 |
| CN | 101904123 A | 12/2010 |
| EP | 1871028 A1 | 12/2007 |
| EP | 1890401 A1 | 2/2008 |
| EP | 2228933 A1 | 9/2010 |
| EP | 2509358 A1 | 10/2012 |
| JP | 2007221178 A | 8/2007 |
| JP | 2011045105 A | 3/2011 |
| JP | 2011521543 A | 7/2011 |
| JP | 2013517651 A | 5/2013 |
| KR | 101089003 B1 | 12/2011 |
| WO | 2008051466 A2 | 5/2008 |
| WO | 2009135574 A1 | 11/2009 |
| WO | 2010082319 A1 | 7/2010 |
| WO | 2011085608 A1 | 7/2011 |
| WO | 2013123961 A1 | 8/2013 |

OTHER PUBLICATIONS

Ericsson, "CQI Tables for Support of 64QAM for HSDPA", 3GPP TSG-RAN WG1 Meeting #48 St. Louis, MO, USA, Feb. 12-16, 2007, Tdoc R1-071083, 6 pages.

Mitsubishi Electric, DSTTD-SGRC text proposal for TR 25. 876 [online], 3GPP TSG-RAN WG1#36, Malaga, Spain, Feb. 16-20, 2004, R1-040290, 5 pages.

Texas Instruments, Modified PSRC (M-PSRC) text proposal for TR 25. 876 [online], 3GPP TSG-RAN WG1#38, Prague, Czech Rep., Aug. 16-19, 2004, R1-040821, 5 pages.

3GPP TS 36.213 V10.4.0, 3rd Generation Partnership Project; Technical Specification Group Radio Access Network; Evolved Unicersal Terrestrial Radio Access(E-UTRA); Physical layer procedures(Release 10), Technical Specification, Dec. 2011, 7 pages.

Motorola, TBS and MCS Signaling and Tables [online], 3GPP TSG-RAN WG1#52bis Shenzhen, China, Mar. 31-Apr. 4, 2008, R1-081638, 14 pages.

* cited by examiner

INFORMATION TRANSMISSION METHOD AND DEVICE

CROSS-REFERENCE TO RELATED APPLICATIONS

This application is a continuation of U.S. patent application Ser. No. 16/158,509, filed on Oct. 12, 2018, which is a continuation of U.S. patent application Ser. No. 15/854,641, filed on Dec. 26, 2017, now U.S. Pat. No. 10,103,838, which is a continuation of U.S. patent application Ser. No. 15/271,044, filed on Sep. 20, 2016, now U.S. Pat. No. 9,871,618, which is a continuation of U.S. patent application Ser. No. 14/474,532, filed on Sep. 2, 2014, now U.S. Pat. No. 9,479,287, which is a continuation of International Application No. PCT/CN2013/071684, filed on Feb. 20, 2013, which claims priority to Chinese Patent Application No. 201210054842.6, filed on Mar. 2, 2012. All of the aforementioned patent applications are hereby incorporated by reference in their entireties.

TECHNICAL FIELD

The present invention relates to mobile communications technologies, and in particular, to an information transmission method and device.

BACKGROUND

Currently, an auto negotiation process of a physical downlink shared channel (Physical Downlink Shared Channel, PDSCH) in a Long Term Evolution (Long Term Evolution, LTE) system is: A user equipment (User Equipment, UE) estimates channel information that is used to measure channel state information (Channel State Information, CSI); by using the estimated channel information, the UN calculates a signal to interference plus noise ratio (Signal to Interference plus Noise Ratio, SINR) based on an optimal rank indication (Rank Indication, RI) and/or a precoding matrix indication (Precoding Matrix Indication, PMI); the UE quantizes the calculated SINR into a 4-bit channel quality indicator (Channel Quality indicator, CQI); the UE reports the CQI value to an evolved NodeB (evolution NodeB, eNB); the eNB allocates a modulation and coding scheme (Modulation and Coding Scheme, MCS) to the UN according to the CQI value reported by the UN and network conditions, where the MCS is used to indicate the modulation and coding scheme currently used by the PDSCH; and the UN receives PDSCH data according to the MCS. In the process of quantizing the SINR into the CQI, a main interval of the SINR is (−7 dB, 19.488 dB), and SINRs outside the interval are processed in a saturation manner.

In a hotspot scenario such as a relay (Relay) or LTE hotspot improvements (LTE Hotspot Improvements, LTE-Hi) scenario, all SINR values obtained by the UE are large. For example, under certain conditions, almost 50% of SINR values of the UE are greater than, 20 dB. However, because the SINR values greater than a maximum value of the main interval are processed in a saturation manner in the process of quantizing the SINR into the CQI, and an index of a CQI corresponding to an SINR in the saturation manner is 15, the UE at most can select only a modulation and coding scheme corresponding to the CQI whose index is 15, which restricts a terminal from selecting a higher modulation and coding scheme and affects system performance.

SUMMARY

Embodiments of the present invention provide an information transmission method and device to solve a problem that system performance is lower than expected in the prior art.

An embodiment of the present invention provides an information transmission method, including:

reporting, by a UE, a CQI value to an eNB;

receiving, by the UE, an MCS value sent by the eNB, where the MCS value is determined by the eNB according to the CQI value; and receiving, by the UE, PDSCH data according to the MCS value, where the CQI value and the MCS value are determined according to a second set of tables, where a modulation scheme that can be supported by the second set of tables is higher than 64QAM.

An embodiment of the present invention provides an information transmission device, including:

a first sending module, configured to report a CQI value to an eNB;

first receiving module, configured to receive an MCS value sent by the eNB, where the MCS value is determined by the eNB according to the CQI value; and a second receiving module, configured to receive PDSCH data according to the MCS value, where the CQI value and the MCS value are determined according to a second set of tables, where a modulation scheme that can be supported by the second set of tables is higher than 64QAM.

From the foregoing technical solution, it can be learned that in the embodiments of the present invention, a set of CQI and MCS tables is reset so that the CQI and the MCS can support modulation schemes higher than 64QAM, therefore implementing support for higher modulation schemes, meeting requirements in a hotspot scenario and improving system performance.

DETAILED DESCRIPTION

Figure 1:
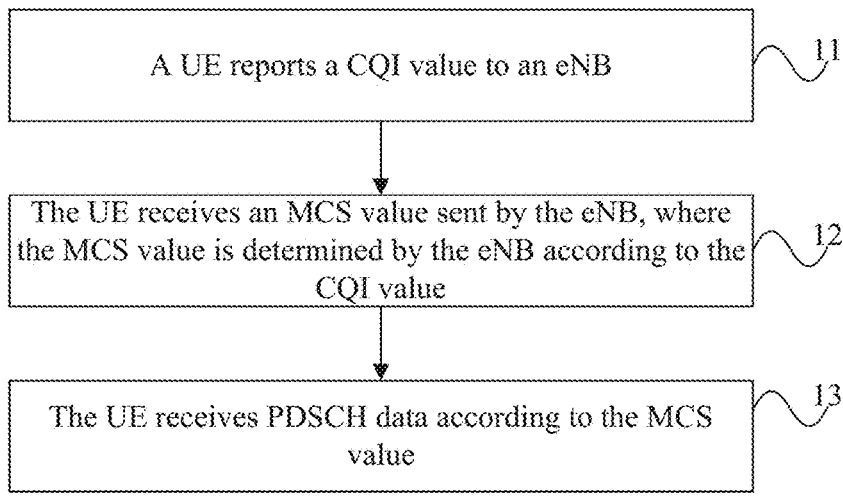
FIG. 1 is a schematic flowchart of an embodiment of an information transmission method according to the present invention.

FIG. 1 is a schematic flowchart of an embodiment of an information transmission method according to the present invention, including:

Step 11: A UE reports a CQI value to an eNB.

Step 12: The UE receives an MCS value sent by the eNB, where the MCS value is determined by the eNB according to the CQI value.

Step 13: The UE receives PDSCH data according to the MCS value, where the CQI value and the MCS value are determined according to a second set of tables, where a modulation scheme that can be supported by the second set of tables is higher than 64QAM.

For a better understanding of the present invention, the following first describes a CQI table and an MCS table in an existing protocol. Table 1 is a CQI table in the existing protocol, and Table 2 is an MCS table in the existing protocol.

TABLE 1

| CQI index (CQI index) | Modulation scheme (modulation) | Code rate × 1024 (code rate × 1024) | Spectral efficiency (efficiency) |
| --- | --- | --- | --- |
| 0 | Out of range (out of range) | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

TABLE 2

| MSC index (MCS index) $I_{MCS}$ | Modulation order (modulation order) $Q_m$ | Transport block size (transport block size, TBS) index (TBS index) $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved (reserved) |
| 30 | 4 | |
| 31 | 6 | |

The numbers 2, 4 and 6 in the modulation orders in the foregoing MCS respectively denote the following modulation schemes: quadrature phase shift keying (Quadrature Phase Shift Keying, QPSK), 16 quadrature amplitude modulation. (Quadrature Amplitude Modulation, QAM), and 64QAM.

It can be seen from Table 1 and Table 2 that the modulation schemes that can be supported by the CQI/MCS in the existing protocol are QPSK, 16QAM, and 64QAM, and the modulation scheme of the highest order is 64QAM.

In a hotspot scenario, an SINR is mostly high, and can sufficiently support a modulation scheme higher than 64QAM. However, according to an existing protocol manner, the highest supported modulation scheme is only 64QAM, which affects system performance.

In this embodiment of the present invention, requirements in the hotspot scenario are considered and a set of CQI/MCS tables is redesigned. To distinguish from the existing protocol, the existing CQI/MCS tables may be referred to as a first set of tables, and the tables redesigned in this embodiment of the present invention may be referred to as a second set of tables. The second set of tables in this embodiment of the present invention supports modulation schemes of higher orders, and support for 256QAM is used as an example in this embodiment of the present invention. Surely, if modulation schemes of higher order need to be supported, modulation schemes of even higher orders such as 1024QAM may be supported.

In specific implementation, a CQI table of a same size as that of an existing CQI table may be used. In this case, values of a modulation scheme, a code rate and spectral efficiency corresponding to each CQI index in the CQI table need to be redesigned; or, the number of bits of the CQI may also be extended, for example, the CQI in the prior art is 4 bits, and the CQI in this embodiment of the present invention may be designed as 5 bits, and therefore, there are 16 additional indexes more than the indexes of the existing CQI, and the additional part is used to denote 256QAM. For specific implementation, refer to subsequent embodiments.

Figure 2:
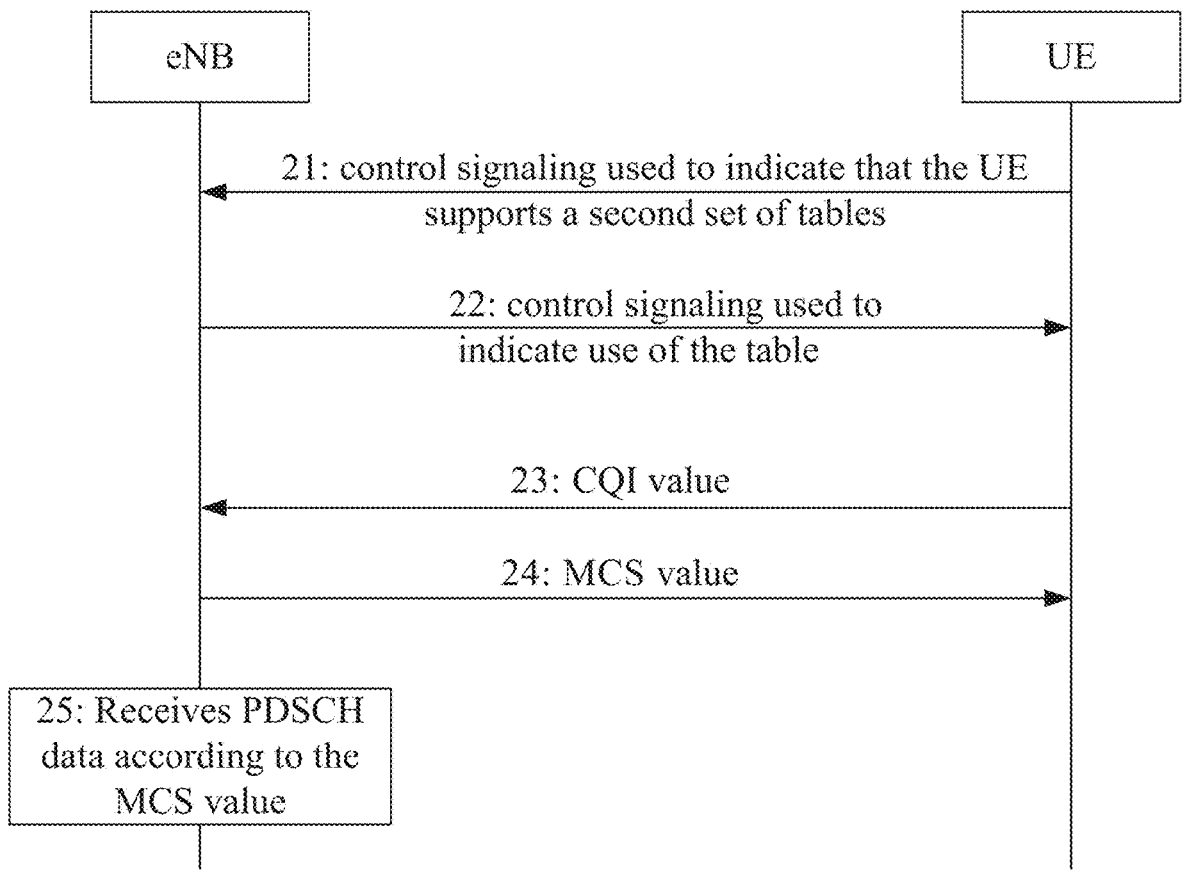
FIG. 2 is a schematic flowchart of another embodiment of an information transmission method according to the present invention.

FIG. 2 is a schematic flowchart of another embodiment of an information transmission method according to the present invention, including:

Step 21: A UE sends control signaling to an eNB, where the control signaling is used to indicate that the OF supports a second set of tables.

The UE may use a feature group indicator (feature Group Indicators, FGI) bit or another radio resource control (Radio Resource Control, RRC) command to notify the eNS that the UE supports the second set of tables.

Step 22: The eNB sends control signaling to the UE, where the control signaling is used to indicate use of the table.

After determining that the UE can support the second set of tables, the eNB may decide whether to use a first set of tables or the second set of tables according to actual network conditions.

For example, the eNB may determine to use the second set of tables if determining that the existing channel conditions are good, and specifically, if a reference signal received power (Reference Signal Received Power, RSRP) or reference signal received quality (Reference Signal Received Quality, RSRQ) that is obtained by means of measurement is greater than a set value. Alternatively, the eNB may determine to use the second set of tables if all CQI orders reported by the UE and received by the eNB in a set time are higher than a set order and data is continuously and correctly received. For example, if all CQI orders reported by the UE and received by the eNB in a set time T are 64QAM and data is continuously and correctly received, the eNB may determine that a modulation scheme of a higher order can be used, and therefore, determine to use the second set of tables.

If the eNB determines to use the second set of tables, control signaling that is used to indicate use of the second set of tables is specifically sent, and this case is used as an example in this embodiment. It can be understood that, when the eNB determines to use the first set of tables, after the eNB sends to the UE control signaling that is used to indicate use of the first set of tables, execution may be implemented according to the prior art.

Step 23: The UE determines a CQI value according to a second set of formats, and sends the CQI value to the eNB.

Step 24: The eNB determines an MCS value according to the second set of formats, and sends the MCS value to the UE.

Step 25: The UE receives PDSCH data according to the MCS value.

The CQI table in the second set of tables may be shown in Table 3, and the MCS table in the second set of tables may be shown in Table 4 or Table 5.

TABLE 3

| CQI index (CQI index) | Modulation scheme (modulation) | Code rate × 1024 (code rate × 1024) | Spectral efficiency (efficiency) |
|---|---|---|---|
| 0 | Out of range (out of range) | | |
| 1 | QPSK | 75 | 0.1467 |
| 2 | QPSK | 294 | 0.5733 |
| 3 | QPSK | 724 | 1.4133 |
| 4 | 16 QAM | 423 | 1.6533 |
| 5 | 16 QAM | 587 | 2.2933 |
| 6 | 16 QAM | 764 | 2.9867 |
| 7 | 64 QAM | 573 | 3.3600 |
| 8 | 64 QAM | 655 | 3.8400 |
| 9 | 64 QAM | 728 | 4.2667 |
| 10 | 64 QAM | 801 | 4.6933 |
| 11 | 64 QAM | 874 | 5.1200 |
| 12 | 256 QAM | 696 | 5.4400 |
| 13 | 256 QAM | 778 | 6.0800 |
| 14 | 256 QAM | 860 | 6.7200 |
| 15 | 256 QAM | 942 | 7.3600 |

TABLE 4

| MSC index (MCS index) $I_{MCS}$ | Modulation order (modulation order) $Q_m$ | Transport block size (transport block size, TBS) index (TBS index) $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 4 | 5 |

TABLE 4-continued

| MSC index (MCS index) $I_{MCS}$ | Modulation order (modulation order) $Q_m$ | Transport block size (transport block size, TBS) index (TBS index) $I_{TBS}$ |
|---|---|---|
| 6 | 4 | 6 |
| 7 | 4 | 7 |
| 8 | 4 | 8 |
| 9 | 4 | 9 |
| 10 | 4 | 10 |
| 11 | 6 | 11 |
| 12 | 6 | 12 |
| 13 | 6 | 13 |
| 14 | 6 | 14 |
| 15 | 6 | 15 |
| 16 | 6 | 16 |
| 17 | 6 | 17 |
| 18 | 6 | 18 |
| 19 | 6 | 19 |
| 20 | 6 | 20 |
| 21 | 8 | 21 |
| 22 | 8 | 22 |
| 23 | 8 | 23 |
| 24 | 8 | 24 |
| 25 | 8 | 25 |
| 26 | 8 | 26 |
| 27 | 8 | 27 |
| 28 | 2 | Reserved (reserved) |
| 29 | 4 | |
| 30 | 6 | |
| 31 | 8 | |

TABLE 5

| MSC index (MCS index) $I_{MCS}$ | Modulation order (modulation order) $Q_m$ | Transport block size (transport block size, TBS) index (TBS index) $I_{TBS}$ |
|---|---|---|
| 0 | 2 | 0 |
| 1 | 1 | 1 |
| 2 | 2 | 2 |
| 3 | 2 | 3 |
| 4 | 2 | 4 |
| 5 | 4 | 4 |
| 6 | 4 | 5 |
| 5 | 4 | 6 |
| 8 | 4 | 4 |
| 9 | 4 | 8 |
| 10 | 4 | 9 |
| 11 | 6 | 10 |
| 12 | 6 | 11 |
| 13 | 6 | 12 |
| 14 | 6 | 13 |
| 15 | 6 | 14 |
| 16 | 6 | 15 |
| 17 | 6 | 16 |
| 18 | 6 | 17 |
| 19 | 6 | 18 |
| 20 | 6 | 19 |
| 21 | 8 | 19 |
| 22 | 8 | 20 |
| 23 | 8 | 21 |
| 24 | 8 | 22 |
| 25 | 8 | 23 |
| 26 | 8 | 24 |
| 27 | 8 | 25 |
| 28 | 2 | Reserved (reserved) |
| 29 | 4 | |
| 30 | 6 | |
| 31 | 8 | |

It can be seen from Table 3 that the CQI table in the second set of tables meets the following conditions:

(1) In any modulation scheme whose modulation order is higher than 2, differences between two adjacent spectral efficiency values are approximately equal, where a being approximately equal to b means that an absolute value of a difference between a and b is less than a set value, where the set value may be 0.2.

For example, corresponding to 16QAM, spectral efficiency is 1.6533, 2.2933, and 2.9867 respectively, and 2.2933-1.6533 is approximately equal to 2.9867-2.2933.

(2) A difference between spectral efficiency values that correspond to two adjacent modulation schemes respectively is less than a difference between any two adjacent spectral efficiency values in a single modulation scheme in the two modulation schemes.

For example, corresponding to adjacent QPSK and 16QAM, the corresponding spectral efficiency is 1.4133 and 1.6533 respectively, and 1.6533-0.4133 is less than 2.2933-1.6533, and is also less than 2.9867-2.2933.

Values in the CQI table that meets the foregoing condition may be obtained in the following manner:

determining a curve of relationships between an SINR and spectral efficiency each modulation scheme.

The spectral efficiency is defined as efficiency of correctly transmitting bits of each modulation symbol, and may be denoted by:

$$\eta = \frac{M}{N} \times Q_{mod},$$

where M is the number of transmitted bits, N is the number of bits after encoding and rate matching are performed, $Q_{mod}$ is an modulation order, and the modulation order of QPSK is 2. The modulation order of 16QAM is 4 . . . .

The design is based on scheduling of 4 RBs. The number N of bits that can be transmitted in the 4 RBs is obtained in the following manner:

One subframe (subframe) has 14 OFDM symbols, and one the OFDMs is reserved for a PDCCH, and the number of available OFDMs is 13.

One RB has 12 REs, and the number of valid REs in one RB of one subframe is 12×13=156.

4 RBs have 4×156=624 valid REs.

For QPSK modulation, the number (N) of encoded bits is 624×2=1248; and, for 16QAM, there are 624×4 bits, and so on. By now, N can be obtained.

The number (N) of original bits transmitted in the 4 RBs is obtained by searching a table according to a TBS allowed by QPP. For details, see the following table:

| i | K | $f_1$ | $f_2$ |
|---|---|---|---|
| 1 | 40 | 3 | 10 |
| 2 | 48 | 7 | 12 |
| 3 | 56 | 19 | 42 |
| 4 | 64 | 7 | 16 |
| 5 | 72 | 7 | 18 |
| 6 | 80 | 11 | 20 |
| 7 | 88 | 5 | 22 |
| 8 | 96 | 11 | 24 |
| 9 | 104 | 7 | 26 |
| 10 | 112 | 41 | 84 |
| 11 | 120 | 103 | 90 |
| 12 | 128 | 15 | 32 |
| 13 | 136 | 9 | 34 |
| 14 | 144 | 17 | 108 |
| 15 | 152 | 9 | 38 |
| 16 | 160 | 21 | 120 |
| 17 | 168 | 101 | 84 |
| 18 | 176 | 21 | 44 |
| 19 | 184 | 57 | 46 |
| 20 | 192 | 23 | 48 |
| 21 | 200 | 13 | 50 |
| 22 | 208 | 27 | 52 |
| 23 | 216 | 11 | 36 |
| 24 | 224 | 27 | 56 |
| 25 | 232 | 85 | 58 |
| 26 | 240 | 29 | 60 |
| 27 | 248 | 33 | 62 |
| 28 | 256 | 15 | 32 |
| 29 | 264 | 17 | 198 |
| 30 | 272 | 33 | 68 |
| 31 | 280 | 103 | 210 |
| 32 | 288 | 19 | 36 |
| 33 | 296 | 19 | 74 |
| 34 | 304 | 37 | 76 |
| 35 | 312 | 19 | 78 |
| 36 | 320 | 21 | 120 |
| 37 | 328 | 21 | 82 |
| 38 | 336 | 115 | 84 |
| 39 | 344 | 193 | 86 |
| 40 | 352 | 21 | 44 |
| 41 | 360 | 133 | 90 |
| 42 | 368 | 81 | 46 |
| 43 | 376 | 45 | 94 |
| 44 | 384 | 23 | 48 |
| 45 | 392 | 243 | 98 |
| 46 | 400 | 151 | 40 |
| 47 | 408 | 155 | 102 |
| 48 | 416 | 25 | 52 |
| 49 | 424 | 51 | 106 |
| 50 | 432 | 47 | 72 |
| 51 | 440 | 91 | 110 |
| 52 | 448 | 29 | 168 |
| 53 | 456 | 29 | 114 |
| 54 | 464 | 247 | 58 |
| 55 | 472 | 29 | 118 |
| 56 | 480 | 89 | 180 |
| 57 | 488 | 91 | 122 |
| 58 | 496 | 157 | 62 |
| 59 | 504 | 55 | 84 |
| 60 | 512 | 31 | 64 |
| 61 | 528 | 17 | 66 |
| 62 | 544 | 35 | 68 |
| 63 | 560 | 227 | 420 |
| 64 | 576 | 65 | 96 |
| 65 | 592 | 19 | 74 |
| 66 | 608 | 37 | 76 |
| 67 | 624 | 41 | 234 |
| 68 | 640 | 39 | 80 |
| 69 | 656 | 185 | 82 |
| 70 | 672 | 43 | 252 |
| 71 | 688 | 21 | 86 |
| 72 | 704 | 155 | 44 |
| 73 | 720 | 79 | 120 |
| 74 | 736 | 139 | 92 |
| 75 | 752 | 23 | 94 |
| 76 | 768 | 217 | 48 |
| 77 | 784 | 25 | 98 |
| 78 | 800 | 17 | 80 |
| 79 | 816 | 127 | 102 |
| 80 | 832 | 25 | 52 |
| 81 | 848 | 239 | 106 |
| 82 | 864 | 17 | 48 |
| 83 | 880 | 137 | 110 |
| 84 | 896 | 215 | 112 |
| 85 | 912 | 29 | 114 |
| 86 | 928 | 15 | 58 |
| 87 | 944 | 147 | 118 |
| 88 | 960 | 29 | 60 |
| 89 | 976 | 59 | 122 |
| 90 | 992 | 65 | 124 |
| 91 | 1008 | 55 | 84 |
| 92 | 1024 | 31 | 64 |
| 93 | 1056 | 17 | 66 |
| 94 | 1088 | 171 | 204 |
| 95 | 1120 | 67 | 140 |

| i | K | $f_1$ | $f_2$ |
|---|---|---|---|
| 96 | 1152 | 35 | 72 |
| 97 | 1184 | 19 | 74 |
| 98 | 1216 | 39 | 76 |
| 99 | 1248 | 19 | 78 |
| 100 | 1280 | 199 | 240 |
| 101 | 1312 | 21 | 82 |
| 102 | 1344 | 211 | 252 |
| 103 | 1376 | 21 | 86 |
| 104 | 1408 | 43 | 88 |
| 105 | 1440 | 149 | 60 |
| 106 | 1472 | 45 | 92 |
| 107 | 1504 | 49 | 846 |
| 108 | 1536 | 71 | 48 |
| 109 | 1568 | 13 | 28 |
| 110 | 1600 | 17 | 80 |
| 111 | 1632 | 25 | 102 |
| 112 | 1664 | 183 | 104 |
| 113 | 1696 | 55 | 954 |
| 114 | 1728 | 127 | 96 |
| 115 | 1760 | 27 | 110 |
| 116 | 1792 | 29 | 112 |
| 117 | 1824 | 2 | 114 |
| 118 | 1856 | 57 | 116 |
| 119 | 1888 | 45 | 354 |
| 120 | 1920 | 31 | 120 |
| 121 | 1952 | 59 | 610 |
| 122 | 1984 | 185 | 124 |
| 123 | 2016 | 113 | 420 |
| 124 | 2048 | 31 | 64 |
| 125 | 2112 | 17 | 66 |
| 126 | 2176 | 171 | 136 |
| 127 | 2240 | 209 | 420 |
| 128 | 2304 | 253 | 216 |
| 129 | 2368 | 367 | 444 |
| 130 | 2432 | 265 | 456 |
| 131 | 2496 | 181 | 468 |
| 132 | 2560 | 39 | 80 |
| 133 | 2624 | 27 | 164 |
| 134 | 2688 | 127 | 504 |
| 135 | 2752 | 143 | 172 |
| 136 | 2816 | 43 | 88 |
| 137 | 2880 | 29 | 300 |
| 138 | 2944 | 45 | 92 |
| 139 | 3008 | 157 | 188 |
| 140 | 3072 | 47 | 96 |
| 141 | 3136 | 13 | 28 |
| 142 | 3200 | 111 | 240 |
| 143 | 3264 | 443 | 204 |
| 144 | 3328 | 51 | 104 |
| 145 | 3392 | 51 | 212 |
| 146 | 3456 | 451 | 192 |
| 147 | 3520 | 257 | 220 |
| 148 | 3584 | 57 | 336 |
| 149 | 3648 | 313 | 228 |
| 150 | 3712 | 271 | 232 |
| 151 | 3776 | 179 | 236 |
| 152 | 3840 | 331 | 120 |
| 153 | 3904 | 363 | 244 |
| 154 | 3968 | 375 | 248 |
| 155 | 4032 | 127 | 168 |
| 156 | 4096 | 31 | 64 |
| 157 | 4160 | 33 | 130 |
| 158 | 4224 | 43 | 264 |
| 159 | 4288 | 33 | 134 |
| 160 | 4352 | 477 | 408 |
| 161 | 4416 | 35 | 138 |
| 162 | 4480 | 233 | 280 |
| 163 | 4544 | 357 | 142 |
| 164 | 4608 | 337 | 480 |
| 165 | 4672 | 37 | 146 |
| 166 | 4736 | 71 | 444 |
| 167 | 4800 | 71 | 120 |
| 168 | 4864 | 37 | 152 |
| 169 | 4928 | 39 | 462 |
| 170 | 4992 | 127 | 234 |
| 171 | 5056 | 39 | 158 |
| 172 | 5120 | 39 | 80 |
| 173 | 5184 | 31 | 96 |
| 174 | 5248 | 113 | 902 |
| 175 | 5312 | 41 | 166 |
| 176 | 5376 | 25 | 336 |
| 177 | 5440 | 43 | 170 |
| 178 | 5504 | 21 | 86 |
| 179 | 5568 | 43 | 174 |
| 180 | 5632 | 45 | 176 |
| 181 | 5696 | 45 | 178 |
| 182 | 5760 | 161 | 120 |
| 183 | 5824 | 89 | 182 |
| 184 | 5888 | 323 | 184 |
| 185 | 5952 | 47 | 186 |
| 186 | 6016 | 23 | 94 |
| 187 | 6080 | 47 | 190 |
| 188 | 6144 | 263 | 480 |

M is K in the foregoing table. By now, M can be obtained.

After M and N are obtained, spectral efficiency can be obtained.

A TBS in each modulation scheme with a code rate that falls within an interval [0, 1] is selected. In AWGN, the TBS is used to emulate a minimum SINR required when a BLER is 10%. By now, the SINR can be obtained.

By using the SINR and the spectral efficiency, a curve of relationships is obtained.

Figure 3:
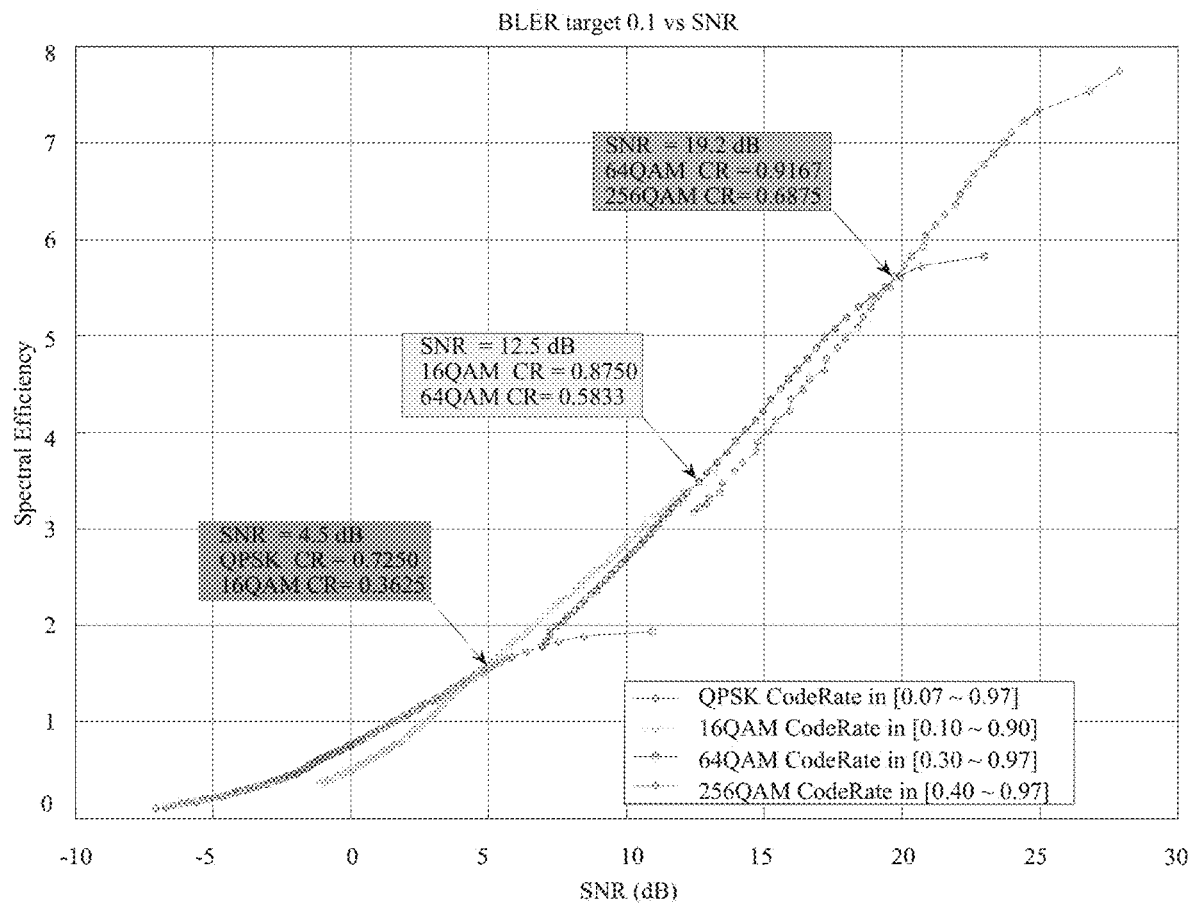
FIG. 3 is a curve of relationships between spectral efficiency and SINRs in different modulation schemes according to the present invention.

Curves of relationships between spectral efficiency and SINRs in different modulation schemes, which are obtained by means of the foregoing emulation, may be shown in Table 3. Referring to FIG. 3, four curves from the bottom up correspond to QPSK, 16QAM, 64QAM, and 256QAM respectively. SINR values and spectral efficiency values at an intersection of two curves are (4.5 dB, 1.45), (12.5 dB, 3.5), and (19.2, 5.5) respectively.

(2) According to the curve of relationships corresponding to each modulation scheme, a value of each item in the CQI corresponding to each modulation scheme is obtained.

A certain number of points may be selected for each modulation scheme. On the curve of relationships corresponding to the modulation scheme, the spectral efficiency corresponding to the selected points is obtained. The value of the obtained spectral efficiency is the value of spectral efficiency in Table 3. The value of the spectral efficiency is divided by the modulation order to obtain a code rate, and then the code rate is multiplied by 1024 to obtain the value of code rate×1024 in Table 3, where the modulation order of QPSK is 2, the modulation order of 16QAM is 4, the modulation order of 64QAM is 6, and the modulation order of 256QAM is 8.

The points selected in each of the modulation schemes meet the following conditions:

(1) When the SINR is less than a set value, tale points selected in an equal-SINR manner; and, when the SINR is greater than or equal to the set value, the points are selected in an equal-spectral-efficiency manner.

In this embodiment, the set value is 4.5 dB, and therefore, for the QPSK scheme, the points are selected in an equal-SINR manner; and, for 16QAM, 64QAM, and 256QAM, the points are selected in an equal-spectral-efficiency manner. It can be understood that because M has a selection range, a point obtained in the equal-spectral-efficiency manner or the equal-SINR manner is a point from which a value can be obtained and which is closest to the point obtained in the equal-SINR manner or the equal-spectral-efficiency manner.

In addition, in this embodiment, to ensure coverage, the CQI table still includes the corresponding modulation scheme when the SINR is small. However, to avoid using excessive CQI indexes to denote the modulation scheme when the SINR is small, the number of the corresponding modulation schemes when the SINR is small is reduced in this embodiment. For example, Table 1 is compared with Table 3 and it can be seen that the number of QPSK modulation schemes used in this embodiment is less than the number of QPSK modulation schemes used in the prior art.

(2) In a set range of an intersection of the curves of relationships corresponding to the two modulation schemes, a CQI index is selected, the modulation scheme corresponding to the selected CQI index is a higher-order modulation scheme in the two modulation schemes, and a difference between the spectral efficiency corresponding to the selected CQI index and maximum spectral efficiency in the other modulation scheme in the two modulation schemes is less than a difference between spectral efficiency values corresponding any two CQI indexes in the higher-order modulation scheme.

The set range may be within a range of 0.5 dB near the intersection. For example, the SINR value at the intersection of QPSK and 16QAM is 4.5 dB, and therefore, CQI index needs to be set in a range of (4.5−0.5, 4.5+0.5), and the modulation scheme corresponding to the index is the higher-order modulation scheme. That is, the corresponding modulation scheme is 16QAM. A value of spectral efficiency and a value of a code rate are obtained according to a curve of relationships corresponding to 16QAM.

Referring to Table 3, a difference between spectral efficiency corresponding to a CQI whose index is 4 and spectral efficiency corresponding to a CQI whose index is 3 is less than a difference between any two of spectral efficiency values corresponding to CQIs whose indexes are 4, 5, and 6.

After the CQI table is determined in the foregoing manner, the MCS table includes:

(1) all modulation schemes included in the CQI table;

for example, values corresponding to QPSK, 16QAM, 64QAM, and 256QAM in Table 3 are 3, 3, 5, and 4 respectively, and therefore, a modulation scheme in Table 4 corresponding to the 4 includes at least 3, 3, 5, and 4 values; and (2) values obtained by performing interpolation for the modulation schemes included in the CQI table.

For example, there are 3 points corresponding to QPSK, and 2 points are obtained after interpolation is performed on the 3 points. The interpolation may specifically be equal interval interpolation. For example, equal-SINR-interval interpolation is used for QPSK, and equal-spectral-efficiency-interval interpolation is used for 16QAM, 64QAM, and 256QAM.

After the interpolation, the MCS table includes the modulation scheme itself and the values after the interpolation, in which at least 3+2=5 values correspond to QPSK. Similarly, in the MCS table, there are at least 3+2=5 values corresponding to 16QAM, there are 5+4=9 values corresponding to 64QAM, and there are 4+3=7 values corresponding to 256QAM.

Because there are 28 valid values in the MCS table, the number of values after the interpolation is 5+5+9+7=26, and values corresponding to two MSC indexes remain. The remaining values of the two MCS indexes may be obtained by performing extrapolation or by selecting a TBS that is the same as that of another adjacent modulation scheme.

In a manner in which extrapolation is, used, for example, referring to Table 4, after extrapolation is performed for 16QAM and QPSK, an MCS index corresponding to 16QAM is obtained; and, after extrapolation is performed for 64QAM and 256QAM, an MCS index corresponding to 64QAM is obtained.

In a manner in which a same TBS is used, for example, referring to Table 5, the TBS with an index of 5 and a modulation scheme of 16QAM is the same as the TBS with an index of 4 and a modulation scheme of QPSK; and the TBS with an index of 20 and a modulation scheme of 64QAM is the same as the TBS with an index of 21 and a modulation scheme of 256QAM.

By means of the foregoing determining principles, a type of the second set of tables may be obtained, such as Table 3 and Table 4, or Table 3 and Table 5. It can be seen from the foregoing tables that the second set of tables can support higher modulation schemes, and specifically can further support 256QAM. For example, when spectral efficiency is approximately 5.5, it can be learned from Table 3 that the used modulation scheme is 256QAM, but in the existing protocol, 64QAM is used. Therefore, this embodiment can support higher-order modulation schemes and improve system performance.

In addition, the number of CQI indexes in the CQI table in the second set of tables is the same as that in the CQI table in the first set of tables. Likewise, the number of MCS indexes in the MCS table in the second set of tables is the same as that in the MCS table in the first set of tables. Therefore, this embodiment is compatible with the existing protocol. Specifically, for the MCS table, because 4 modulation schemes are supported in this embodiment, 4 bits are required in the reserved part of the MCS table. The reserved part may be an MCS index number used for hybrid automatic repeat request (Hybrid Automatic Repeat Request, HARQ) retransmission.

The number of indexes in the second set of tables used in the foregoing embodiment is the same as that in the existing first set of tables. Optionally, the present invention gives another embodiment. In this embodiment, different from the existing CQI that occupies 4 bits, the CQI in this embodiment occupies 5 bits, and therefore, the number of CQI indexes is 32, but the existing number of CQI indexes is 16. In this case, the additional index entries may be used to denote 256QAM.

In a new CQI table, N index numbers are reserved for other signaling notification, where N=Nmodu−1, and Nmodu is the number of supported modulation schemes.

In this case, a size of the MCS table may be the same as that in the prior art, but higher modulation schemes are supported.

In this embodiment, a higher-order modulation scheme can be supported by using the second set of tables; and, with the QPSK modulation scheme still included, coverage is sufficiently considered. Compared with the prior art, this embodiment reduces values corresponding to QPSK, which can reduce waste of feedback overhead. By selecting a smaller difference between spectral efficiency values in two adjacent modulation schemes, transition between the two modulation schemes is more stable. The corresponding value is obtained for the higher-order modulation scheme in an equal-spectral-efficiency manner, which can improve system performance smoothly.

Figure 4:
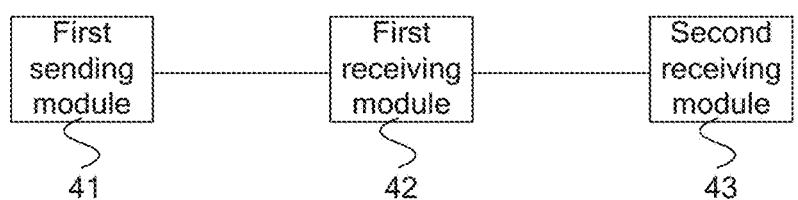
FIG. 4 is a schematic structural diagram of an embodiment of an information transmission device according to the present invention.

FIG. 4 is a schematic structural diagram of an embodiment of an information transmission device according to the present invention. The device may be a UE. The device includes a first sending module 41, a first receiving module 42, and a second receiving module 43. The first sending module 41 is configured to report a CQI value to an eNB; the first receiving module 42 is configured to receive an MCS value sent by the eNB, where the MCS value is determined by the eNB according to the CQI value; and the second receiving module 43 is configured to receive PDSCH data according to the MCS value, where the CQI value and the MCS value are determined according to a second set of tables, where a modulation scheme supported by the second set of tables is higher than 64QAM.

Figure 5:
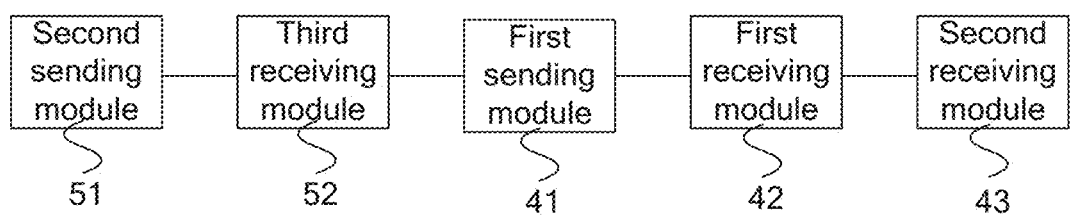
FIG. 5 is a schematic structural diagram of another embodiment of an information transmission device according to the present invention.

Optionally, referring to FIG. 5, the device may further include a second sending module 51 and a third receiving module 52. The second sending module 51 is configured to send control signaling to the eNB, where the control signaling is used to indicate that the device supports the second set of tables; and the third receiving module 52 is configured to receive control signaling sent by the eNB, where the control signaling is used to indicate use of the second set of tables.

Figure 6:
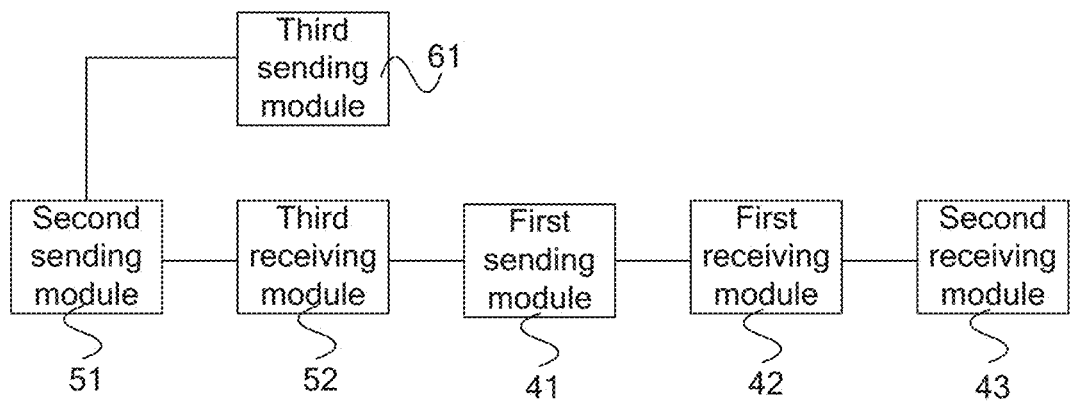
FIG. 6 is a schematic structural diagram of another embodiment of an information transmission device according to the present invention.

Optionally, referring to FIG. 6, the device may further include a third sending module 61. The third sending module 61 is configured to: if control signaling that is sent by the eNB and used to indicate use of a first set of tables is received, use the first set of tables to report the CQI value to the eNB so that the eNB determines the MCS value according to the first set of tables.

Optionally, the second set of tables corresponding to the first sending module and the first receiving module meets the following conditions:

some entries in the second set of tables are the same as those in the first set of tables;

the number of CQI indexes of a CQI table in the second set of tables is the same as that in the first set of tables; and the number of MCS indexes of an MCS table in the second set or tables is the same as that in s first set of tables, and the MCS table in the second set of tables includes MCS index entries reserved for HARQ retransmission of a modulation scheme higher than 64QAM.

Optional, the first sending module determines the CQI value by using the CQI table in the second set of tables, and spectral efficiency in the CQI table in the second set of tables meets the following conditions:

in any modulation scheme whose modulation order is higher than 2, differences between two adjacent spectral efficiency values are approximately equal, where being approximately equal to b means that an absolute value of a difference between a and b is less than a set value; and a difference between spectral efficiency values that respective correspond to two adjacent modulation schemes is less than a difference between any two adjacent spectral efficiency values in a single modulation scheme in the two modulation schemes.

Optional the MCS value received by the first receiving module is determined by using the MCS table in the second set of tables, and the MOS table in the second set of tables includes:

all modulation schemes included in the CQI table;

values obtained by performing interpolation for the modulation schemes included in the CQI table; and values obtained by performing extrapolation for the modulation schemes included in the CQI table; or, values that have the same TBS as that of the modulation schemes included in the CQI table.

Further, the eNB may use the following manner to determine a type of the table to be used:

if an RSRP or an RSRQ greater than a set value, determining to use the second set of tables; or if CQI orders reported by the UE and received in a set time are higher than a set order and data is continuously and correctly received, determining to use the second set of tables.

Further, the CQI table in the second set of tables in this embodiment may be specifically shown in Table 3, and the MCS table in the second set of tables may be specifically shown in Table 4 or Table 5.

In this embodiment, a higher-order modulation scheme can be supported by using the second set of tables; and, with the QPSK modulation scheme still included, coverage is sufficiently considered. Compared with the prior art, this embodiment reduces values corresponding to QPSK, which can reduce waste of feedback overhead. By selecting a smaller difference between spectral efficiency values in two adjacent modulation schemes, transition between the two modulation schemes is more stable. The corresponding value is obtained for the higher-order modulation scheme in an equal-spectral-efficiency manner, which can improve system performance smoothly.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent substitutions to some or all the technical features thereof, without departing from the spirit and scope of the technical solutions of the embodiments of the present invention.

What is claimed is:

1. An information transmission method, comprising:
receiving, by a terminal device, a first control signaling from a network device, wherein the first control signaling indicates use of a first channel quality indicator (CQI) table or a second CQI table, the terminal device supporting use of both the first and second CQI table;
determining, by the terminal device, to use the first CQI table based on the first control signaling;
determining, by the terminal device, a CQI value by using the first CQI table; and
reporting, by the terminal device, the CQI value to the network device;
wherein the first and second CQI tables include a relationship between CQI value indexes and modulation schemes, the modulation schemes of the first CQI table include quadrature phase shift keying (QPSK), 16 quadrature amplitude modulation (QAM), 64QAM, and 256QAM, and the modulation schemes of the second CQI table include QPSK, 16QAM, and 64QAM but does not include 256QAM; and
a total number of CQI indexes in the first CQI table is 16, and the first CQI table includes 3 values corresponding to QPSK, 3 values corresponding to 16QAM, 5 values corresponding to 64QAM, and 4 values corresponding to 256QAM.

2. The method according to claim 1, wherein
some entries in the first CQI table are the same as those in the second CQI table;
a number of CQI indexes in the first CQI table is the same as that in the second CQI table; and
a quantity of values corresponding to QPSK in the first CQI table is less than that in the second CQI table.

3. The method according to claim 1, further comprising:
sending, by the terminal device, a second control signaling to the network device, wherein the second control signaling indicates that the terminal device supports the first CQI table.

4. The method according to claim 1, wherein the terminal device further supports a first modulation and coding scheme (MCS) table and a second MCS table;
modulation schemes of the first MCS table include QPSK, 16 QAM, and 64QAM;
modulation schemes of the second MCS table include QPSK, 16 QAM, 64QAM, and 256QAM; and
a number of MCS indexes in the second MCS table is the same as that in the first MCS table, the second MCS table includes 4 reserved indexes.

5. The method according to claim 4, wherein the second MCS table includes at least 5 values corresponding to QPSK.

6. An information transmission method, comprising:
sending, by a network device, a first control signaling to a terminal device, wherein the first control signaling indicates use of a first channel quality indicator (CQI) table or a second CQI table; and
receiving, by the network device, a CQI value from the terminal device, the CQI value is determined based on the first CQI table or the second CQI table according to the first control signaling;
wherein the first and second CQI tables include a relationship between CQI value indexes and modulation schemes, the modulation schemes of the first CQI table include quadrature phase shift keying (QPSK), 16 quadrature amplitude modulation (QAM), 64QAM, and 256QAM, and modulation schemes of the second CQI table include QPSK, 16QAM, and 64QAM but does not include 256QAM; and
a total number of CQI indexes in the first CQI table is 16, and the first CQI table includes 3 values corresponding to QPSK, 3 values corresponding to 16 QAM, 5 values corresponding to 64QAM, and 4 values corresponding to 256QAM.

7. The method according to claim 6, wherein
some entries in the first CQI table are the same as those in the second CQI table;
a number of CQI indexes in the first CQI table is the same as that in the second CQI table;
a quantity of values corresponding to QPSK in the first CQI table is less than that in the second CQI table.

8. The method according to claim 6, further comprising:
receiving, by the network device, a second control signaling from the terminal device, wherein the second control signaling indicates that the terminal device supports the first CQI table.

9. The method according to claim 6, wherein the terminal device further supports a first modulation and coding scheme (MCS) table and a second MCS table;
modulation schemes of the first MCS table include QPSK, 16 QAM, and 64QAM;
modulation schemes of the second MCS table include QPSK, 16 QAM, 64QAM, and 256QAM; and
a number of MCS indexes in the second MCS table is the same as that in the first MCS table, the second MCS table includes 4 reserved indexes.

10. An information transmission apparatus, comprising:
a receiver, configured to receive a first control signaling from a network device, wherein the first control signaling indicates use of a first channel quality indicator (CQI) table or a second CQI table;
a processor, configured to determine a CQI value by using either the first CQI table or the second CQI table, according to the first control signaling; and
a transmitter, configured to report the CQI value to the network device;
wherein the first and second CQI tables include a relationship between CQI value indexes and modulation schemes, the modulation schemes of the first CQI table include quadrature phase shift keying (QPSK), 16 quadrature amplitude modulation (QAM), 64QAM, and 256QAM, and the modulation schemes of the second CQI table include QPSK, 16QAM, and 64QAM but does not include 256QAM; and
a total number of CQI indexes in the first CQI table is 16, and the first CQI table includes 3 values corresponding to QPSK, 3 values corresponding to 16 QAM, 5 values corresponding to 64QAM, and 4 values corresponding to 256QAM.

11. The apparatus according to claim 10, wherein
some entries in the first CQI table are the same as those in the second CQI table;
a number of CQI indexes in the first CQI table is the same as that in the second CQI table;
a quantity of values corresponding to QPSK in the first CQI table is less than that in the second CQI table.

12. The apparatus according to claim 10, wherein
the transmitter is further configured to send a second control signaling to the network device, wherein the second control signaling indicates that the information transmission apparatus supports the first CQI table.

13. The apparatus according to claim 10, wherein the information transmission apparatus further support a first modulation and coding scheme (MCS) table and a second MCS table;
modulation schemes of the first MCS table include QPSK, 16 QAM, and 64QAM;
modulation schemes of the second MCS table include QPSK, 16 QAM, 64QAM, and 256QAM;
a number of MCS indexes in the second MCS table is the same as that in the first MCS table, the second MCS table includes 4 reserved indices.

14. The method according to claim 13, wherein the second MCS table includes at least 5 values corresponding to QPSK.

15. An information transmission apparatus, comprising:
a transmitter, configured to send a first control signaling to a terminal device, wherein the first control signaling indicates use of a first channel quality indicator (CQI) table instead of a second CQI table; and
a receiver, configured to receive a CQI value from the terminal device, the CQI value is determined based on the first CQI table;
wherein the first and second CQI tables include a relationship between CQI value indexes and modulation schemes, the modulation schemes of the first CQI table include quadrature phase shift keying (QPSK), 16 Quadrature Amplitude Modulation (QAM), 64QAM, and 256QAM, and the modulation schemes of the second CQI table include QPSK, 16QAM, and 64QAM but does not include 256QAM; and a total number of CQI indexes in the first CQI table is 16, and the first CQI table includes 3 values corresponding to QPSK, 3 values corresponding to 16 QAM, 5 values corresponding to 64QAM, and 4 values corresponding to 256QAM.

16. The apparatus according to claim 15, wherein some entries in the first CQI table are the same as those in the second CQI table;

a number of CQI indexes in the first CQI table is the same as that in the second CQI table;

a quantity of values corresponding to QPSK in the first CQI table is less than that in the second CQI table.

17. The apparatus according to claim 15, wherein the transmitter is further configured to send a second control signaling to the network device, wherein the second control signaling indicates that the information transmission apparatus supports the first CQI table.

18. The apparatus according to claim 15, wherein the information transmission apparatus further supports a first modulation and coding scheme (MCS) table and a second MCS table;

modulation schemes of the first MCS table include QPSK, 16 QAM, and 64QAM;

modulation schemes of the second MCS table include QPSK, 16 QAM, 64QAM, and 256QAM; and a number of MCS indexes in the second MCS table is the same as that in the first MCS table, the second MCS table includes 4 reserved indexes.

19. A non-transitory computer-readable medium having processor-executable instructions stored thereon, the processor-executable instructions, when executed, facilitate performance of a data transmission method comprising:

receiving a first control signaling from a network device, wherein the first control signaling indicates use of a first channel quality indicator (CQI) table or a second CQI table, the terminal device supporting use of both the first and second CQI table;

determining to use the first CQI table based on the first control signaling;

determining a CQI value by using the first CQI table; and reporting the CQI value to the network device;

wherein the first and second CQI tables include a relationship between CQI value indexes and modulation schemes, the modulation schemes of the first CQI table include quadrature phase shift keying (QPSK), 16 Quadrature Amplitude Modulation (QAM), 64QAM, and 256QAM, and the modulation schemes of the second CQI table include QPSK, 16QAM, and 64QAM but does not include 256QAM; and a total number of CQI indexes in the first CQI table is 16, and the first CQI table includes 3 values corresponding to QPSK, 3 values corresponding to 16 QAM, 5 values corresponding to 64QAM, and 4 values corresponding to 256QAM.

20. A non-transitory computer-readable medium having processor-executable instructions stored thereon, the processor-executable instructions, when executed, facilitate performance of a data transmission method comprising:

sending a first control signaling to a terminal device, wherein the first control signaling indicates use of a first channel quality indicator (CQI) table instead of a second CQI table; and receiving a CQI value from the terminal device, the CQI value is determined based on the first CQI table;

wherein the first CQI table includes a relationship between CQI value indexes and modulation schemes, the modulation schemes of the first CQI table include quadrature phase shift keying (QPSK), 16 Quadrature Amplitude Modulation (QAM), 64QAM, and 256QAM and modulation schemes of the second CQI table include QPSK, 16QAM, and 64QAM but does not include 256QAM; and a total number of CQI indexes in the first CQI table is 16, and the first CQI table includes 3 values corresponding to QPSK, 3 values corresponding to 16 QAM, 5 values corresponding to 64QAM, and 4 values corresponding to 256QAM.

21. The method according to claim 1, wherein the first CQI table further includes one value corresponding to out of range.

22. The method according to claim 6, wherein the first CQI table further includes one value corresponding to out of range.

23. The apparatus according to claim 10, wherein the first CQI table further includes one value corresponding to out of range.

24. The apparatus according to claim 15, wherein the first CQI table further includes one value corresponding to out of range.

* * * * *